United States Patent
Bhaskaran et al.

(10) Patent No.: US 7,466,845 B2
(45) Date of Patent: Dec. 16, 2008

(54) INTERACTIVE PHOTO SYSTEM

(75) Inventors: Vasudev Bhaskaran, Sunnyvale, CA (US); William Chen, Foster City, CA (US)

(73) Assignee: Seiko Epson Corporation, Tokyo (JP)

( * ) Notice: Subject to any disclaimer, the term of this patent is extended or adjusted under 35 U.S.C. 154(b) by 490 days.

(21) Appl. No.: 11/214,255

(22) Filed: Aug. 29, 2005

(65) Prior Publication Data
US 2007/0047842 A1   Mar. 1, 2007

(51) Int. Cl.
G06K 9/00 (2006.01)
G06K 9/54 (2006.01)
G06K 9/60 (2006.01)

(52) U.S. Cl. ............ 382/112; 382/305; 707/104.1; 358/1.9; 358/3.26

(58) Field of Classification Search ............ 382/305, 382/112, 274, 275; 707/104.1; 358/1.9, 358/3.26, 504, 531, 406, 463, 302
See application file for complete search history.

(56) References Cited

U.S. PATENT DOCUMENTS

| | | | |
|---|---|---|---|
| 5,852,823 A | 12/1998 | De Bonet | |
| 6,504,571 B1 | 1/2003 | Narayanaswami et al. | |
| 6,608,563 B2 | 8/2003 | Weston et al. | |
| 7,136,191 B2 * | 11/2006 | Kaltenbach et al. | 358/1.9 |
| 2002/0171737 A1 * | 11/2002 | Tullis | 348/143 |
| 2003/0234960 A1 * | 12/2003 | Kaltenbach et al. | 358/3.24 |
| 2007/0047031 A1 * | 3/2007 | Kaltenbach et al. | 358/504 |

OTHER PUBLICATIONS

"MiAlbum-A System for Home Photo Management Using the Semi-Automatic Image Annotation Approach", Liu Wenyin, et al., Oct. 2000.

* cited by examiner

*Primary Examiner*—Aaron W Carter

(57) ABSTRACT

An interactive photo system that provides an interesting and entertaining way to link photos from the digital and analog domains. The system enables easy conversion of a paper-based photo into digital form. The conversion process generally involves a user holding up a paper-based photo image in front of a camera of the system, such that the captured image is rendered in a specific location on a display screen. The system adjusts the captured image for orientation and illumination irregularities in creating a digital version of the paper-based photo. The system further includes a database of digital images and a content retrieval engine to which content from the just-converted digital image can be used as a search query to search the database for other similar digital photos.

9 Claims, 2 Drawing Sheets

INTERACTIVE PHOTO SYSTEM

BACKGROUND OF THE INVENTION

1. Field of the Invention

The present invention relates to an interactive photo system including techniques that enable a paper-based photo to be easily converted into a digital representation, which may then be used as the basis of a query to a digital photo album or file residing stored on an apparatus with digital-image-viewing capability. The techniques may be realized by methods, various steps/aspects of which may be performed by an appropriately configured device or apparatus. The functions of the methods or steps thereof may be specified by software, hardware, or combination thereof

2. Description of the Related Art

In recent years there has been a significant increase in digital photography-related products. Taking digital photos and uploading them to a computer database or file has become quite common. The transfer of photos from the digital camera to the computer database is a straightforward and rather simple process today. A scanner may also be connected to the computer to scan paper documents including paper-based photos to digitize their contents for storage on the computer.

Once the photos are entered into the computer database, users typically want an easy way to retrieve one or more specific photos from among a larger group of photos in the database for display to show friends or relatives. Unfortunately, this is still a cumbersome process. Most photo retrieval engines address the issue of how to retrieve one or more photos using a keyword or date query. These retrieval engines work reasonably well in finding the photos that contain the date or keyword used as the query. However, the effectiveness of such a retrieval system is dependent on the diligence of those involved in annotating the photos, as the annotation provides the basis for the search. Needless to say, the ongoing task of annotating digital photos is tedious and not particularly fun. As a consequence, photo annotation is usually either not done at all or is started but not continued. The end result is that effectiveness of the retrieval system is compromised. Other ways of retrieving a photo or photos from a photo database are not usually addressed. Hence, many keyword- or date-based query engines have not been well accepted in the marketplace, in view of their lack of ease of use.

Conventional photo systems also lack alternate ways of entering a paper-based photo into a digital database. PC-centric systems still assume that the user will scan a paper-based photo and then enter it into the database. Thus, there is no convenient way in conventional photo systems to link paper-based photos with similar photos that are created in digital form.

What is needed is an improved photo system having components that provide a convenient way to enter paper-based photos into the system and an easy-to-use yet effective retrieval engine for retrieving photos stored in the system and for linking paper-based photos with similar photos that are created in digital form.

OBJECTS OF THE INVENTION

Accordingly, it is an object of the present invention to provide an interactive photo system that provides an easy and entertaining way to enter paper-based photos into the system.

Another object of this invention is to provide such a system with an easy-to-use and effective content retrieval engine for retrieving stored photos and to provide an interesting way to link photos from the analog and digital domains.

SUMMARY OF THE INVENTION

According to one aspect of the invention, a photo system is provided. Generally, the photo system comprises a display; an image capture device in communication with the display; and image processing logic in communication with the display and the image capture device. The display, the image capture device, and image processing logic cooperate to capture an image of a paper-based photo image on the display, to correct for perspective distortion in the captured image, and to generate a digital photo image from the distortion-corrected captured image. A database stores digital photo images including the digital photo image created from the paper-based photo image; and a content retrieval engine is adapted to accept as a query input the content of the digital photo image created from the paper-based photo image, to search the database for one or more digital photo images matching the content of the query input, and to retrieve each matching digital photo image.

Preferably, the image processing logic comprises an illumination correction module configured to adjust illumination characteristics of the generated digital photo image. The illumination correction module is configured to determine an ambient brightness and subtract the determined ambient brightness from the generated digital photo image. In one embodiment, the paper-based photo image is captured multiple times, each time at a different angle, and the illumination correction module adjusts the illumination characteristics of the generated digital photo image based on a comparison of the multiple captures.

In another aspect, the invention involves a method for entering paper-based photo images to a photo system. The method comprises capturing a paper-based photo image and displaying the captured image; compensating for perspective distortion in the captured image; generating a digital photo image from the distortion-corrected captured image; extracting content from the generated digital photo image; and using the extracted content as a query input to search for and retrieve each digital photo image from a defined search location having a content that substantially matches the extracted content.

If necessary, the illumination characteristics of the generated digital photo image may be adjusted as explained above with respect to the photo system.

According to another aspect, the method described above or steps thereof may be specified by a device-readable set or program of instructions that are embodied on a medium or waveform that is conveyed to an instruction-based, processor-controlled device, or that are embedded in a hardware device, such as an application specific integrated circuit (ASIC), digital signal processing circuitry, or the like. The instructions may be in software, hardware, or combination thereof.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings like reference symbols refer to like parts.

DESCRIPTION OF THE PREFERRED EMBODIMENTS

The interactive photo system of the present invention provides an interesting and entertaining way to link photos from the digital and analog domains. Such a system enables easy conversion of a paper-based photo into digital form. The system enables easy searching for digital photos that are similar to the now-digitally-converted paper-based photo.

Figure 1:
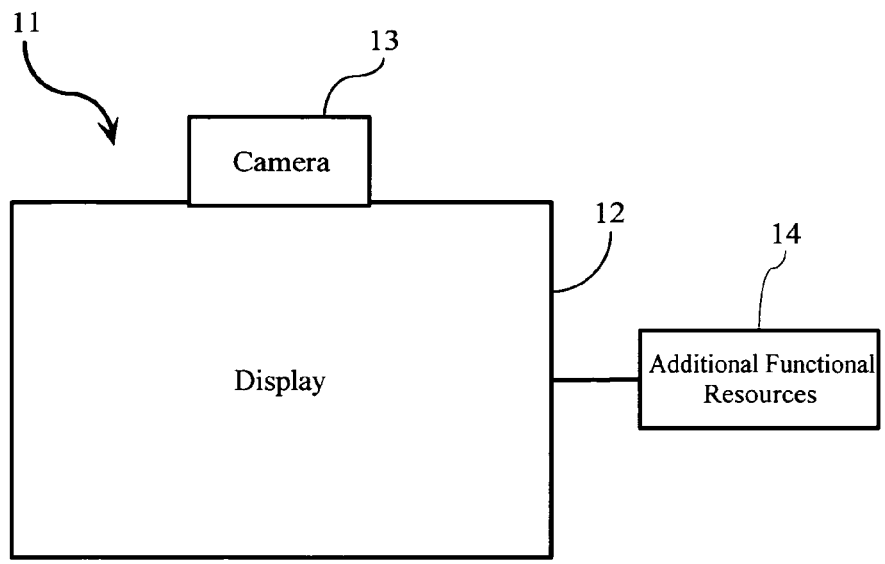
FIG. 1 is block diagram of an interactive photo system according to embodiments of the invention.

Referring to FIG. 1, an interactive photo system 11 constructed according to embodiments of the present invention is illustrated. The system 11 includes a display, which may be that of a television (TV) display or other suitable type, and an image capture device 13 typically in the form of a camera in communication with, and preferably mounted in a suitable location relative to, the display 12. In accordance with the invention, system 11 further includes additional hardware and software components or modules 14 that provide resources for performing the functions of the interactive photo system. Such components/modules and their respective functions will be described below.

Figure 2:
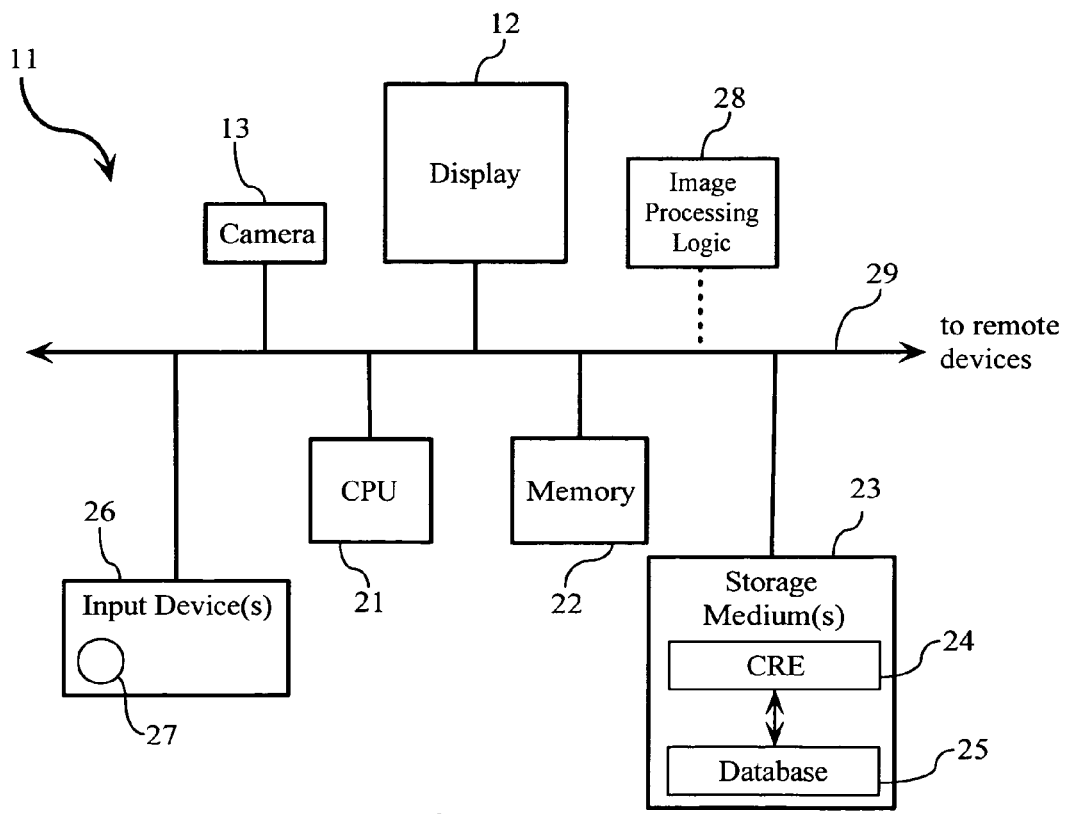
FIG. 2 is a block diagram showing the interrelationship between various components that may be used to implement an exemplary interactive photo system according to embodiments of the invention.

A more detailed illustration of an exemplary system 11 and its components/modules, which may be used to implement the various processes and functions of the invention, is shown in FIG. 2. As illustrated in FIG. 2, the system 11 includes a central processing unit (CPU) 21 that provides computing resources and controls the system. CPU 21 may be implemented with a microprocessor or the like, and may also include auxiliary processors for specialized functions, such as a floating point coprocessor for mathematical computations and a voice recognition processor for processing voice commands. System 11 further includes system memory 22 which may be in the form of random-access memory (RAM) and read-only memory (ROM). The system memory may be used to store a program that implements an algorithm of the present invention during the program's execution, as well as input, output data and/or intermediate results.

One or more storage mediums 23 is/are also included for longer term storage of data and programs of instructions for operating systems, utilities and applications, one of which is preferably a content retrieval engine (CRE) 24. At least one storage medium 23 includes a database 25 where digital photo images, included those converted from paper-based photos, are stored and available for searching and retrieval via the content retrieval engine. Each storage medium 23 may be of any known type, e.g., magnetic tape or disk, optical medium, etc.

System 11 further includes various operator input devices 26, which may be in the form of a keyboard, mouse and/or stylus, etc. to facilitate the manipulation of data. Input device (s) 26 preferably also includes an audio input 27 that is capable of receiving voice commands, e.g., a command to search database 25 for photos "similar" to a particular paper-based photo. The command is processed by the voice recognition processor of CPU 21 and used to direct the conversion, search and retrieval functions.

In accordance with embodiments of the invention, system 11 further includes image processing logic, in the form of software and/or hardware. Such logic includes various image processing modules, i.e., transformation module, illumination correction module, that apply processing techniques to the digital data of paper-based photo images that have been captured by the camera 13. Such processing is discussed in detail below. Image processing logic is shown as a hardware module 28 in FIG. 2, but the invention is by no means limited to this arrangement. A software implementation of some or all of the functions encompassed by such logic is another equally plausible alternative. In the case of full or partial software implementation of the image processing logic, the software likely resides in one or more of the storage medium 23 and is fetched by the RAM of memory 22 for execution.

System 11 may be equipped to enable connection to remote devices through any of a variety of networks including the Internet, a local area network (LAN), a wide area network (WAN), or through any suitable electromagnetic carrier signals including infrared signals.

In the illustrated system, all major system components connect to bus 29 which may represent more than one physical bus, and in fact in this context includes any known structure, construction, arrangement, technique, method and/or process for physically transferring a signal from one point in the system to another. In this regard, it should be noted that various system components may or may not be physically connected to the system. For example, the image capture device, e.g., the camera 13, may be in communication with other components of the system through a suitable electromagnetic signal. One or more input devices may likewise be "wirelessly" connected to other system components.

Figure 3:
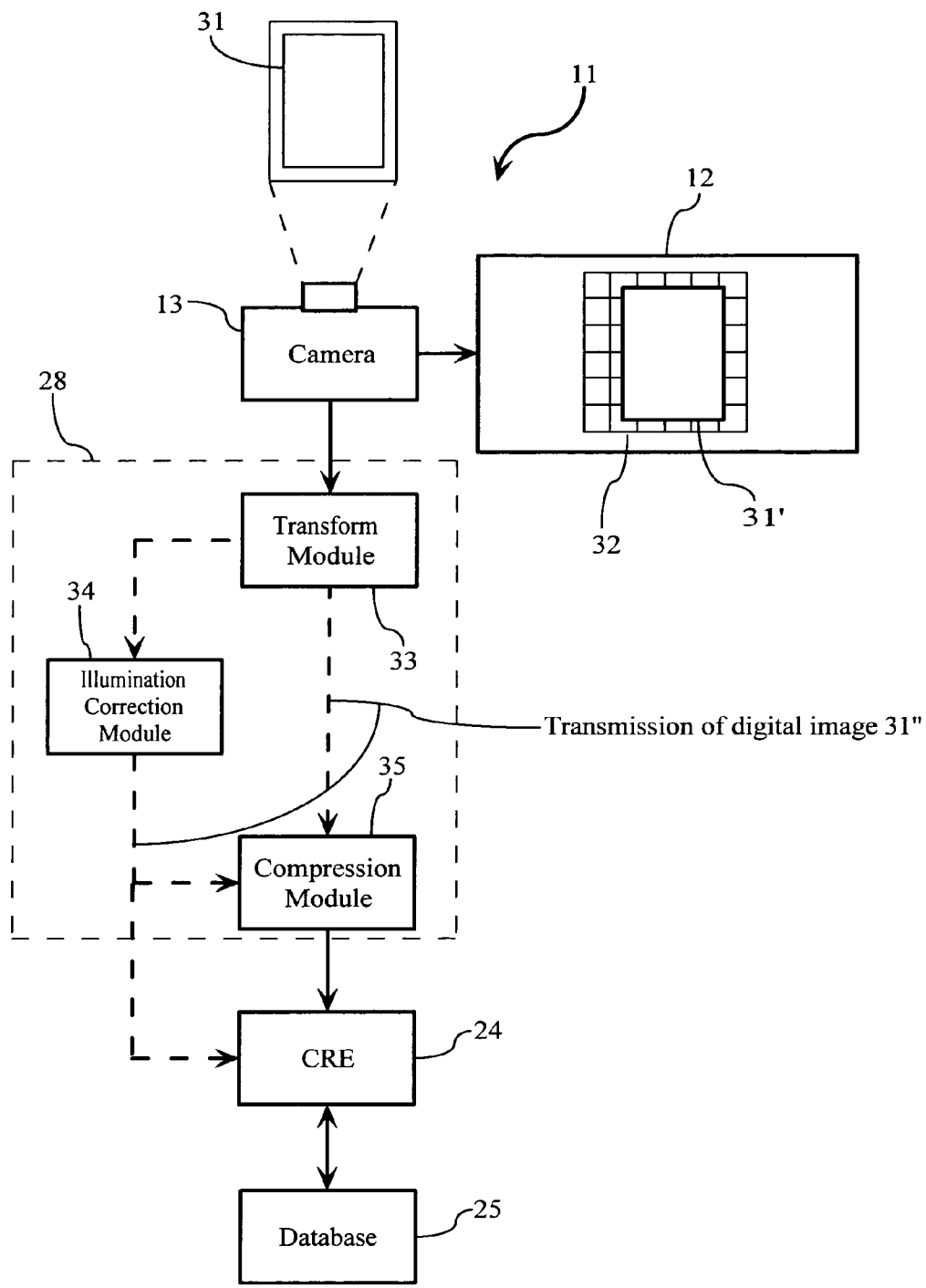
FIG. 3 is a functional block diagram showing the processing flow of data according to embodiments of the invention.

Reference is now made to FIG. 3, which is a functional block diagram showing the processing flow of data in accordance with embodiments of the invention.

In one embodiment, a user holds up a paper-based photo in front of camera 13, which captures the image 31 on a paper-based photo. To make sure that the photo-based photo image 31 is held at a proper distance from camera 13 and to enable the user to keep the photo image somewhat perpendicular relative to the optical axis of camera 13, a small rectangular framing box, e.g., a grid 32, is preferably displayed on display 12. The user can then move the paper-based photo containing image 31 closer or farther away from camera 13 to ensure that the entire captured image 31' is contained within grid 32, which will also let the user know if the captured image is aligned properly from a rotational standpoint. If the captured image 31' appears "slanted" relative to grid 32, the user can also make the appropriate adjustment. Of course, it is understood that such adjustment is visually-based, and in any event, CRE 24 is designed to handle rotation offset during the capture process. The rendering of grid 32, which is done in a known manner by a transform module 33 that is part of image processing logic 28, provides a convenient way of correcting for perspective distortions.

To compensate for lighting conditions in the room, prior to the photo image 31 being digitized, illumination correction module 34, which is also part of image processing logic 28, is configured to run a relatively simple calibration process, if the logic determines that such calibration is necessary. In one embodiment, such a process involves prompting the user to hold up an image of a white template in front of camera 13, which captures a representation of this white template. Knowing that the color of this template is white and knowing the color composition of captured image 31', camera 13 or illumination correction module 34 can estimate an ambient brightness, e.g., the average brightness, of the room. In another embodiment, image processing logic 28 may prompt the user to hold the paper-based photo with image 31 at different angles relative to the capture surface, e.g., lens surface, of camera 13, so that the several captured versions of image 31 are obtained. Having the color compositions of several versions, camera 13 or illumination correction module 34 can estimate the average ambient brightness or other brightness indicator of the room. In either embodiment, the calibration process makes it easier to correct for illumination changes.

When captured image 31' is then digitized to generated digital image 31", the room brightness estimation made in the calibration process is subtracted from digitized image 31", which is then sent to a compression module 35 where it is compressed, preferably using JPEG or other well known compression techniques. If illumination correction is not performed, digital image 31" is transmitted directly from transform module 33 to compression module 35. The digitization can be done in response to a voice or other input command.

The compressed, e.g., JPEG representation, of digital image 31" is then input as a search query to content retrieval engine (CRE) 24, which searches for and retrieves from database 25 similar looking photos. This process can be initiated via a voice command or other input command. Preferably, CRE 24 is able to test for matches in different rotational orientations, e.g., 0°, 45°, 90°, 135°, 180°, etc. Content retrieval engine (CRE) 24 preferably uses an image-content-based search algorithm. CRE 24 may be as described in application Ser. No. 10/762,448 entitled "EXIF-Based Image Feature Set for Content Engine," filed on Jan. 22, 2004 and assigned to the assignee of the present application. The contents of application Ser. No. 10/762,448 are incorporated by reference herein in their entirety.

In addition to being used as a search tool, the digital photo image 31" just created from paper-based photo 31 can also be added to database 25.

As the foregoing demonstrates, the present invention provides an improved photo system having components that provide a convenient way to enter paper-based photos into the system and an easy-to-use yet effective retrieval engine for retrieving photos stored in the system and for linking paper-based photos with similar photos that are created in digital form. The system is able to reduce distortions that may occur during the inputting of a paper-based photo into the system and also to compensate for various lighting conditions. The CRE is also able to handle certain rotational offsets.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A photo system, comprising:
   a display;
   an image capture device in communication with the display; and
   image processing logic in communication with the display and the image capture device;
   wherein the display, the image capture device, and image processing logic cooperate to capture an image of a paper-based photo image multiple times, each time at a different angle, and a illumination correction module adjusts the illumination characteristics of the generated digital photo image based on a comparison of the multiple captures to generate a digital photo image from the corrected captured image;
   a database configured to store digital photo images including the digital photo image created from the paper-based photo image; and
   a content retrieval engine adapted to accept as a query input the content of the digital photo image created from the paper-based photo image, to search the database for one or more digital photo images matching the content of the query input, and to retrieve each matching digital photo image.

2. A photo system as recited in claim 1, wherein the illumination correction module determines an ambient brightness and subtracts the determined ambient brightness from the generated digital photo image.

3. A method for entering paper-based photo images to a photo system, the method comprising:
   capturing a paper-based photo image multiple times, each time at a different angle;
   adjusting illumination characteristics based on a comparison of the multiple captures of the paper-based photo image;
   generating a digital photo image from the illumination adjusted captured image of the paper-based photo image;
   extracting content from the generated digital photo image; and
   using the extracted content as a query input to search for and retrieve each digital photo image from a defined search location having a content that substantially matches the extracted content.

4. A method as recited in claim 3, wherein the adjusting step further comprises determining an ambient brightness and subtracting the determined ambient brightness from the generated digital photo image.

5. A computer-readable medium containing a device-readable set of instructions adapted to cause the method of claim 3 to be performed when the set of instructions is executed.

6. A computer-readable medium as recited in claim 5, wherein the set of instructions is software, hardware, or combination thereof.

7. A method for capturing a paper-based photo image comprising:
   capturing the paper-based photo at multiple times, each time at a different angle, creating multiple captures of the paper-based photo;
   adjusting illumination characteristics based on a comparison of the multiple captures of the paper-based photo image; and
   generating a digital photo image from the multiple captures of the paper- based photo image using the adjusted illumination characteristics.

8. A computer-readable medium containing a device-readable set of instructions adapted to cause the method of claim 7 to be performed when the set of instructions is executed.

9. A computer-readable medium as recited in claim 8, wherein the set of instructions is software, hardware, or combination thereof.

* * * * *